(12) United States Patent
Oroskar (10) Patent No.: US 8,948,746 B1
(45) Date of Patent: Feb. 3, 2015

(54) ENABLING AN EXTENT OF SUBSTANTIALLY SIMULTANEOUS COMMUNICATION BASED ON DEVICE PREVALENCE

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 280 days.

(21) Appl. No.: 13/661,122

(22) Filed: Oct. 26, 2012

(51) Int. Cl.
*H04W 4/00* (2009.01)

(52) U.S. Cl.
USPC ...................................................... 455/426.1

(58) Field of Classification Search
CPC ..... H04W 48/18; H04W 36/00; H04W 36/14; H04W 36/16; H04W 36/22; H04W 36/24; H04W 36/34; H04W 60/04; H04W 16/10; H04W 28/02; H04W 28/26; H04W 72/00; H04W 72/06
See application file for complete search history.

(56) References Cited

U.S. PATENT DOCUMENTS

| | | | |
|---|---|---|---|
| 5,778,319 A | 7/1998 | Sawaki | |
| 6,295,451 B1 | 9/2001 | Mimura | |
| 7,136,655 B2 | 11/2006 | Skafidas et al. | |
| 7,555,301 B2 | 6/2009 | Skafidas et al. | |
| 7,818,022 B2 | 10/2010 | Yamamoto | |
| 7,986,669 B1 * | 7/2011 | Oh | 370/331 |
| 8,078,164 B2 | 12/2011 | Ganesan | |
| 8,620,319 B1 * | 12/2013 | Thandu et al. | 455/436 |
| 2008/0039089 A1 | 2/2008 | Berkman et al. | |
| 2008/0299927 A1 | 12/2008 | Tenbrook et al. | |
| 2012/0184258 A1 | 7/2012 | Kovvali et al. | |
| 2013/0072190 A1 * | 3/2013 | Pitkamaki | 455/436 |
| 2013/0329647 A1 * | 12/2013 | Keller et al. | 370/328 |

* cited by examiner

*Primary Examiner* — Wayne Cai
*Assistant Examiner* — Shantell L Heiber (57) ABSTRACT

A RAN may determine a metric indicative of a prevalence of WCDs of a first type served by the RAN. WCDs of a second type may also be served by the RAN. WCDs of the first type may communicate with the RAN using a first air-interface or a second air-interface, and WCDs of the second type may communicate using the second air-interface. The RAN may engage in a first extent of communication with WCDs of the first type or the second type when using the second air-interface. The RAN may compare the metric to a threshold WCD prevalence, and based on the comparison, select a second extent of communication to engage in with WCDs of the first type or the second type. The RAN may receive a call setup request related to a particular WCD, and select at most the second extent of wireless coverage areas for the particular WCD.

20 Claims, 8 Drawing Sheets

ENABLING AN EXTENT OF SUBSTANTIALLY SIMULTANEOUS COMMUNICATION BASED ON DEVICE PREVALENCE

BACKGROUND

To provide wireless communication service, a wireless service provider, or "wireless carrier," typically operates a radio access network (RAN) that defines one or more coverage areas in which wireless communication devices (WCDs) can be served by the RAN. In this way, a WCD may obtain connectivity to broader networks such as the publically-switched telephone network (PSTN) and/or the Internet. A typical RAN may include one or more base transceiver stations (BTSs). These BTSs may be macro network cell towers and/or femtocells, each of which may radiate to define wireless coverage areas through which WCDs can communicate. Further, the RAN may include one or more base station controllers (BSCs), which may be integrated with or otherwise in communication with the BTSs. The BSCs may include, or be in communication with, a switch or gateway that provides connectivity with one or more transport networks. With this arrangement, a cell phone, personal digital assistant, wirelessly equipped computer, or any other WCD that is positioned within coverage of the RAN, may be able to communicate with a BTS and in turn, via the BTS, with other served devices or with other entities accessible via the transport network.

OVERVIEW

In networks that provide service under both Long-Term Evolution (LTE) and Code Division Multiple Access (CDMA) protocols, service providers may support enhanced circuit-switched fallback (eCSFB) functionality. eCSFB functionality may allow service providers to use their existing CDMA network for circuit-switched voice calls, and use LTE to support packet-switched data calls for WCDs that support CDMA and LTE. Thus, WCDs that are CDMA- and LTE-capable may be configured to switch to CDMA when originating or receiving voice calls. In this manner, CDMA may be used by both WCDs that are configured to communicate only through CDMA and WCDs that are configured to communicate using both CDMA and LTE. Thus, when eCSFB is supported, a RAN may generally use its CDMA traffic channels for voice calls and some data calls, while using LTE traffic channels for other functionality. It should be noted that LTE-capable WCDs may also be configured to conduct, or otherwise capable of conducting, voice calls using LTE.

Herein, WCDs that are capable of operating according to eCSFB may be referred to as "eCSFB devices" or "eCSFB WCDs." On the other hand, WCDs that are not capable of LTE communications may be referred to herein as "non-eCSFB devices" or "non-eCSFB WCDs." It should be noted that other types of devices exist that may support LTE but not support CDMA.

Accordingly, in a first example embodiment, a RAN may determine a metric indicative of prevalence of WCDs of a first type that are served by the RAN. WCDs of a second type may also be served by the RAN. WCDs of the first type may be configured to communicate with the RAN using a first air-interface or a second air-interface, and WCDs of the second type may be configured to communicate using the second air-interface and not the first air-interface. For instance, WCDs of the first type may be eCSFB WCDs and WCDs of the second type may be non-eCSFB WCDs. Further, the first air-interface may operate in accordance with LTE, and the second air-interface may operate in accordance with CDMA.

The RAN may be configured to engage in a first extent of substantially simultaneous communication with WCDs of either the first type or the second type when using the second air-interface. Herein, the term "substantially simultaneously" may be used to describe communications involving two or more discrete messages that pass through two or more different intermediate points at approximately the same time, such as within a few tens of milliseconds or less.

The RAN may compare the metric to a threshold WCD prevalence. Based on the comparison of the metric to the threshold WCD prevalence, the RAN may select a second extent of substantially simultaneous communication to engage in with WCDs of the first type and/or the second type. Upon receiving a call setup request related to a particular WCD, and, in response to receiving the call setup request, the RAN may select at most the second extent of wireless coverage areas to engage in communication with the particular WCD using the second air-interface.

As an example, if the metric meets the threshold WCD prevalence, indicating that a level of prevalence of WCDs of the first type exceeded the threshold WCD prevalence for example, the RAN may assign at most the second extent of wireless coverage areas to the particular WCDs. In this example, the second extent may be less than the first extent of wireless coverage areas. For instance, if the first extent included six wireless coverage areas, the second extent may include between one and five wireless coverage areas. Thus, by assigning at most the second extent wireless coverage areas, the RAN may preserve RAN resources associated with the second air-interface.

If the selected wireless coverage areas consist of one wireless coverage area, the RAN may communicate with the particular WCD via the one wireless coverage area. If the selected wireless coverage areas consist of more than one wireless coverage area, the RAN may communicate with the particular WCD substantially simultaneously via each selected wireless coverage area.

If the metric does not meet the threshold WCD prevalence, the second extent may be selected to be equal to or greater than the first extent. For example, if the first extent includes four wireless coverage areas, the second extent may include six or more wireless coverage areas.

During establishment of a call in which the particular WCD participates, the RAN may transmit substantially simultaneously respective channel assignment messages to the particular WCD via each selected wireless coverage area. Additionally or alternatively, during establishment of a call in which the particular WCD participates, the RAN may assign, to the particular WCD, respective traffic channels from each selected wireless coverage area. In this case, the RAN may transmit and receive identical copies of the same bearer traffic via each of the assigned traffic channels.

A second example embodiment may include a non-transitory computer-readable storage medium, having stored thereon program instructions that, upon execution by a RAN device, cause the RAN device to perform functions in accordance with the first example embodiment.

A third example embodiment may include a RAN device, comprising at least one processor and data storage. The data storage may contain program instructions executable by the processor to cause the RAN device to operate in accordance with the first example embodiment.

The foregoing overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems, devices, and methods with reference to the accompanying figures. The illustrative system, device, and method embodiments described herein are not meant to be limiting. It may be readily understood that certain aspects of the disclosed systems, devices, and methods can be arranged and combined in a wide variety of different configurations, all of which are contemplated herein.

WCDs may be referred to as "mobile stations," as is common when referring to WCDs in the context of a CDMA network, and also as "user equipment" (UE), as is common when referring to WCDs in the context of an LTE network. Thus, the terms "mobile station," "wireless communication device" (or WCD), and/or "user equipment" (or UE) may be used interchangeably.

Mobile communications systems may accommodate multiple radio access systems like CDMA, LTE, and wireless Local Area Networks (wireless LANs) in a partially or fully integrated manner. WCD mobility may be provided among such systems. This mobility may provide transmission, reception and continuous communication even if the WCDs move geographically or from system to system.

LTE is an emerging technology that may provide communication services using the Internet Protocol (IP), possibly without existing circuit-switched domain functions. Accordingly, services like voice calls that have traditionally been provided over the circuit-switched domain may be replaced by Voice Over Internet Protocol (VOIP), for example. This may include deployment of an IP Multimedia Subsystem (IMS) as a service control platform. The IMS may refer to a communications system that integrates services provided by circuit-switched technology with packet-switched technologies such as the Session Initiation Protocol (SIP), the Media Gateway Control Protocol (MGCP), the Real-time Transport Protocol (RTP), etc.

However, it may take some time before LTE, IMS, and/or VOIP services can be provided in all coverage areas. But, even if VOIP is available for an LTE-capable WCD, it may still be desirable to use CDMA voice capabilities to conduct some voice calls, because of the extensive CDMA infrastructure that is already deployed and because circuit-switched CDMA voice is a well understood and reasonably reliable technology.

Thus, in one example, WCDs that are both CDMA- and LTE-capable may be configured to switch to CDMA when originating or receiving voice calls. This function, called "Circuit-Switched Fallback," or CSFB enables voice services for CDMA- and LTE-capable WCDs using existing circuit-switched CDMA domain functions.

Although CDMA and LTE are used herein as examples, other network protocols or standards such as WiFi, Global System for Mobile Communications (GSM), Enhanced Data Rates for GSM Evolution (EDGE), General Packet Radio Service (GPRS), Worldwide Interoperability for Microwave Access (WiMAX), Evolution-Data Optimized (EV-DO) and Wideband CDMA (WCDMA) standards can be used instead or as well. Thus, for instance, an eCSFB device may fall back from WiMAX or WiFi to another network for voice calls. Other proprietary technologies and protocols can also be used.

In some scenarios, during a call, a WCD (either eCSFB or non-eCSFB) may communicate with a CDMA RAN substantially simultaneously via a number of wireless coverage areas. For instance, the WCD may transmit and/or receive the same information via two or more discrete messages that traverse two or more different wireless coverage areas at approximately the same time, such as within a few tens of milliseconds or less. By transmitting multiple messages to the WCD, the likelihood that the WCD may receive at least one of these messages is increased. Also, when the CDMA RAN substantially simultaneously communicates bearer traffic with the WCD via more than one wireless coverage area, the likelihood of the WCD receiving the bearer traffic may increase. This substantially simultaneous communication may thus improve the reliability of communication involving the WCD. In this manner, call quality may increase and fewer calls may fail. Further, the CDMA RAN may assign multiple traffic channels from different wireless coverage areas to the WCD during call establishment. Assignment of multiple traffic channels during call establishment may increase the reliability and quality of the initial portions of the calls.

However, substantially simultaneous communication with each WCD via several wireless coverage areas may involve multiple resources of the CDMA RAN being assigned to or otherwise used by each WCD during a call. As the number of WCDs and calls increase in the network, assigning multiple resources to each WCD may deplete these resources. Such depletion of network resources may cause further calls relating to other WCDs to fail since there may be no resources available to assign to the other WCDs.

To alleviate this resource depletion, the RAN may keep track of prevalence of eCSFB WCDs. These WCDs may be capable of communicating through LTE as well as CDMA. If the level of prevalence of eCSFB WCDs reaches a threshold WCD prevalence, the RAN may disable or limit the use of multiple CDMA resources to calls being established or that are established with WCDs. For example, the RAN may assign a single resource to a particular WCD or assign fewer resources for substantially simultaneous communication than it assigned prior to reaching the threshold WCD prevalence. As an example for illustration, the RAN may communicate substantially simultaneously with the particular WCD via six wireless coverage areas prior to reaching the threshold WCD prevalence. If the threshold WCD prevalence is reached, the RAN may begin communicating substantially simultaneously with other WCDs establishing new call via only one to three wireless coverage areas, for example. Thus, the RAN may preserve and/or prioritize the CDMA resources.

FIGS. 1-5 describe example network architectures and configurations. It should be understood that network arrangements shown in FIGS. 1-5, and other arrangements described herein are set forth only as examples. As such other alternative arrangements and elements (e.g., machines, interfaces, functions, orders, and groupings of functions, etc.) can be used instead, and some elements may be omitted altogether. Further, many of the elements described herein may be functional entities implemented as discrete or distributed components or in conjunction with other components, and in any suitable combination and location. In addition, various functions described herein as being performed by one or more entities may be carried out by hardware, firmware, and/or software.

I. Network Architecture

Figure 1:
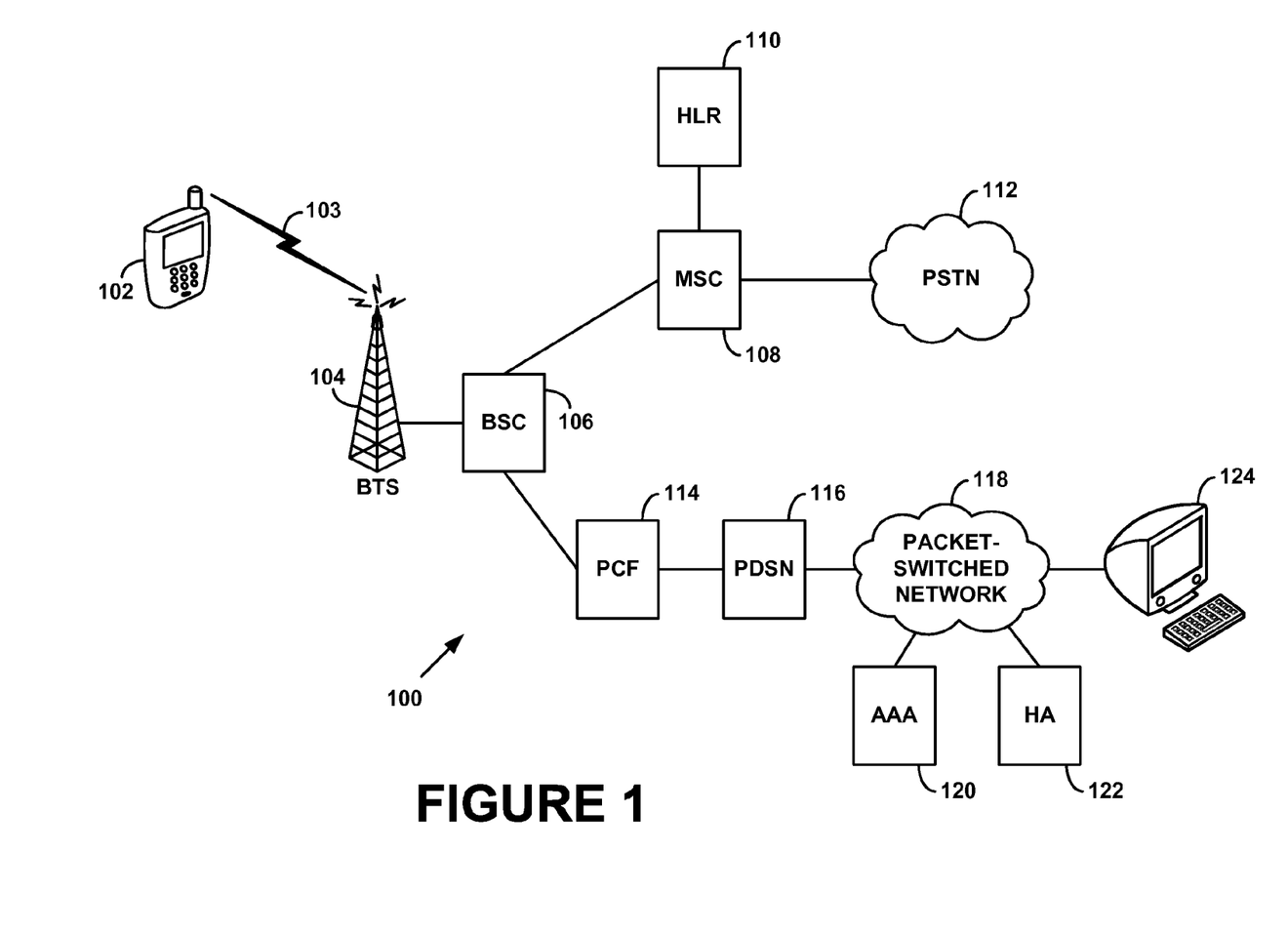
FIG. 1 illustrates a RAN, in accordance with an example embodiment.

FIG. 1 shows a simplified block diagram of a wireless communication system 100 in which example embodiments can be employed. WCD 102 may communicate over an Air-interface 103 with a BTS 104, which is, in turn, coupled to or integrated with a BSC 106. Transmissions over Air-interface 103 from BTS 104 to WCD 102 may represent a "forward link" to WCD 102. Conversely, transmissions over Air-interface 103 from WCD 102 to BTS 104 may represent a "reverse link" from WCD 102.

BSC 106 may be connected to a mobile switching center (MSC) 108. BSC 106, MSC 108, or both, may act to control assignment of Air-interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124. After acquiring a traffic channel over Air-interface 103, WCD 102 may transmit a request to PDSN 116 for a connection to the packet data network. Then, following authentication of WCD 102 by AAA server 120, WCD 102 may be assigned an IP address by PDSN 116 or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
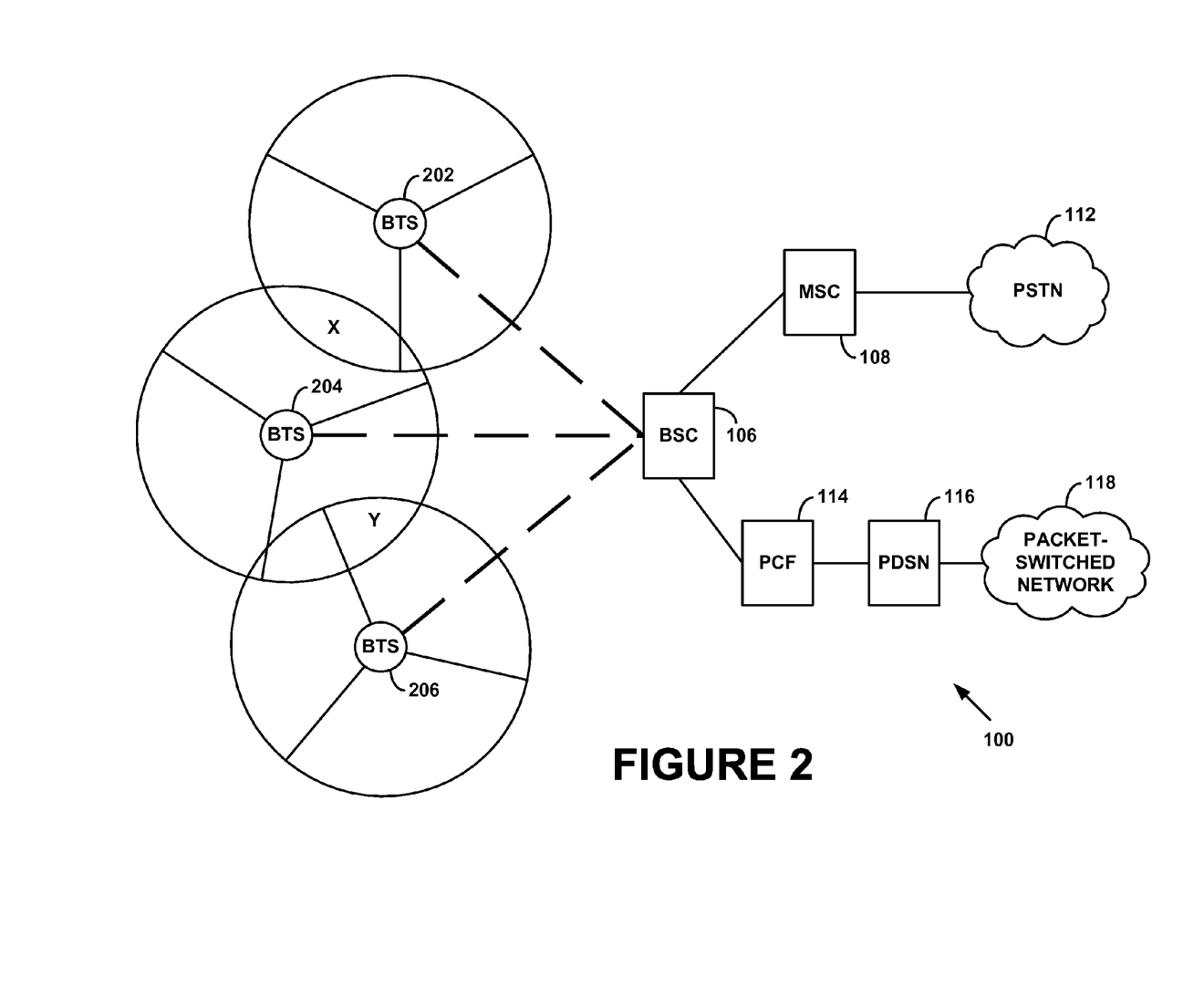
FIG. 2 depicts a RAN radiating to define several wireless coverage areas, in accordance with an example embodiment.

In practice, a BSC may serve multiple BTSs, each of which may then radiate to define one or more wireless coverage areas. This arrangement is illustrated in FIG. 2, which shows BSC 106 in network 100 coupled with BTSs 202, 204, and 206. Each BTS is shown at the core of a respective circle representing wireless coverage, and each circle is divided into three pie-shaped pieces representing wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas for each of the BTSs in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, wireless coverage areas need not be pie-shaped, and may take on other shapes and arrangements instead.

A WCD may transmit and/or receive the same signals substantially simultaneously from more than one wireless coverage area. To illustrate that point, FIG. 2 includes points X and Y. While in the vicinity of point X, a WCD may be able to transmit and/or receive signals substantially simultaneously from wireless coverage areas of BTS 202 and BTS 204. Similarly, while in the vicinity of point Y, a WCD may be able to transmit and/or receive signals substantially simultaneously from wireless coverage areas of BTS 204 and BTS 206. It should be noted that, in practice, a WCD located at or near points X or Y may be able to transmit and/or receive signals substantially simultaneously from more than two wireless coverage areas. This substantially simultaneously communication may include bearer as well as signaling traffic.

In general, the depictions of both FIGS. 1 and 2 are illustrative. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
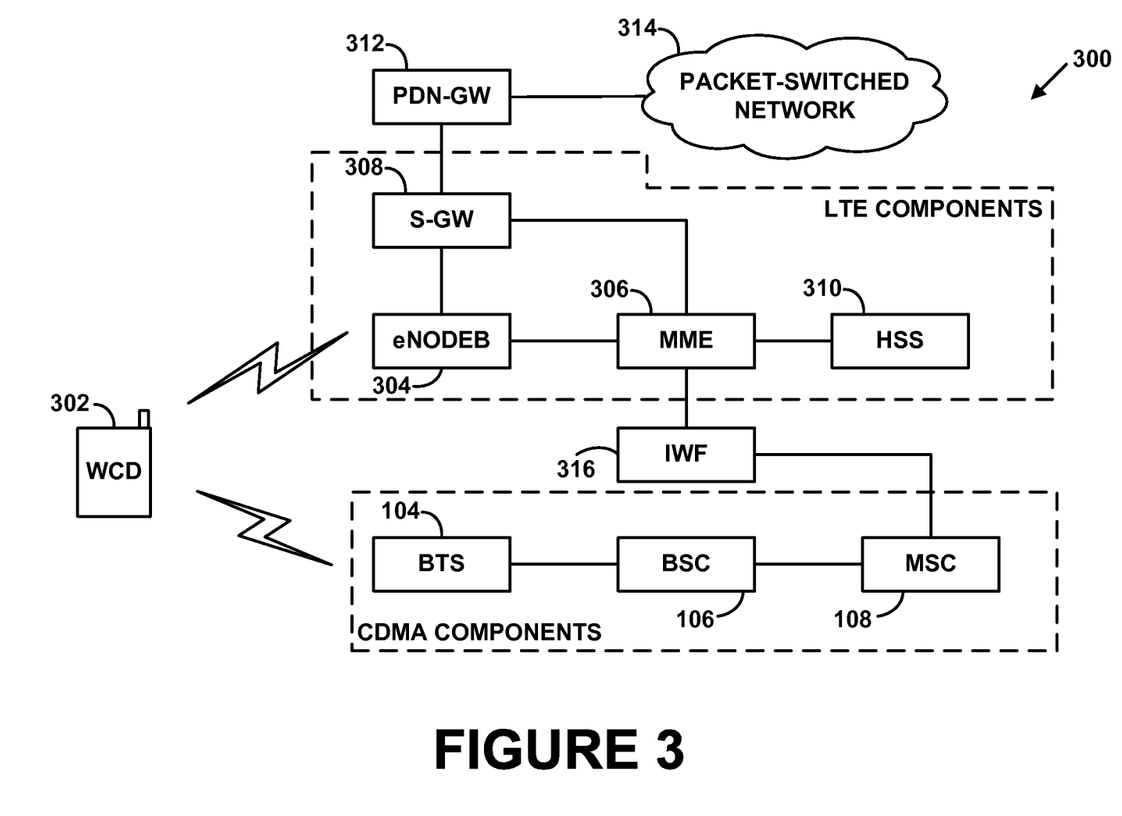
FIG. 3 is a block diagram of a wireless communication network, in accordance with an example embodiment.

FIG. 3 is a block diagram of a wireless communication network 300 in which a service provider may support wireless service under two or more different air-interface protocols, in accordance with an example embodiment. In particular, FIG. 3 shows an example RAN that includes CDMA components, such as the CDMA components described in FIGS. 1 and 2, and LTE components. LTE may be characterized as exhibiting relatively high speed data transmission, while CDMA may be characterized as exhibiting relatively high quality circuit-switched voice calls, for example. As such, a WCD 302 operating in network 300 may connect and communicate using different air-interface protocols, such as CDMA and LTE. In practice, network 300 may include two or more separate access networks with at least partially overlapping wireless coverage areas (e.g., separate access networks for LTE and CDMA). Alternatively, some or all components may be combined so as to support both CDMA and LTE communications.

In the illustrated configuration, network 300 includes components to provide for CDMA communications. Specifically, FIG. 3 shows BTS 104, BSC 106, and MSC 108, which collectively, and possibly in conjunction with other components that help to provide service under CDMA, may be referred to as a CDMA network as described with respect to FIGS. 1 and 2. Multiple wireless coverage areas may possibly be defined by BTS 104.

Network 300 may also include components to provide WCD 302 with service under LTE. In particular, network 300 includes one or more eNodeBs 304, which may include base stations configured to support over-the-air communications with WCD 302. Thus, eNodeB 304 may be an LTE analog of BTS 104 of the CDMA network. Each eNodeB 304 may provide service using LTE in one or more wireless coverage areas, such as a cell or one or more cell-sectors.

Network 300 may also include a mobility management entity (MME) 306, which may be configured to control communications between one or more eNodeBs 304 and a serving gateway (S-GW) 308. MME 306 may also be communicatively coupled to a home subscriber server (HSS) 310, which stores subscriber information, such as information related to WCD 302. More generally, MME 306 may support functionality such as mobility management, bearer management, paging message distribution, security functions, authentication of WCDs, gateway selection for communications, and so on.

In an example configuration, S-GW 308 may be configured to communicate with eNodeBs 304 and/or with MME 306 in order to provide various functions such as packet routing and forwarding, mobility anchoring, packet buffering, and so on. For instance, S-GW 308 may provide packet routing for LTE communications to and/or from WCD 302. Thus, functionality of MME 306 and S-GW 308 may be an LTE analog of some functionality of MSC 108 of the CDMA network.

Yet further, an LTE access network may include a packet data network gateway (PDN-GW) 312, which facilitates packet-data communications between S-GW 308 that operates according to LTE, and packet-switched network 314.

In a further aspect, network 300 may include an interworking function (IWF) 316, which may be a functional component of network 300 that supports interworking between different wireless technologies, such as CDMA and LTE. In an example configuration, IWF 316 may support communications between components of an LTE network (e.g., MME 306) and components of a CDMA network (e.g., MSC 108), so that a service provider may implement enhanced circuit-switched fallback (eCSFB) functionality, possibly among other functionalities.

Network 300 illustrates LTE and CDMA components as one example. Any other type of components for other network protocols such as Wifi, GSM, GPRS, EDGE, WiMAX, EV-DO, and WCDMA can be used.

II. Example RAN Configurations

Figure 4A:
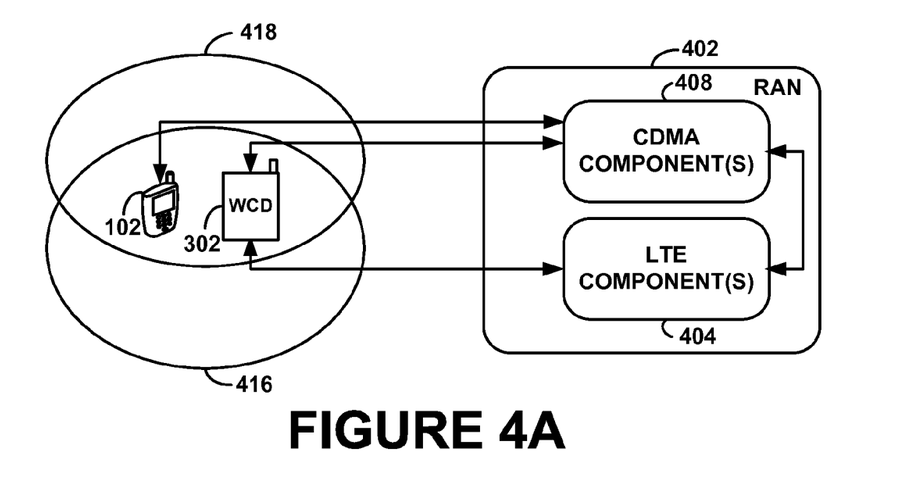
FIG. 4A illustrates a RAN that includes an LTE component and a CDMA component, in accordance with an example embodiment.
Figure 4B:
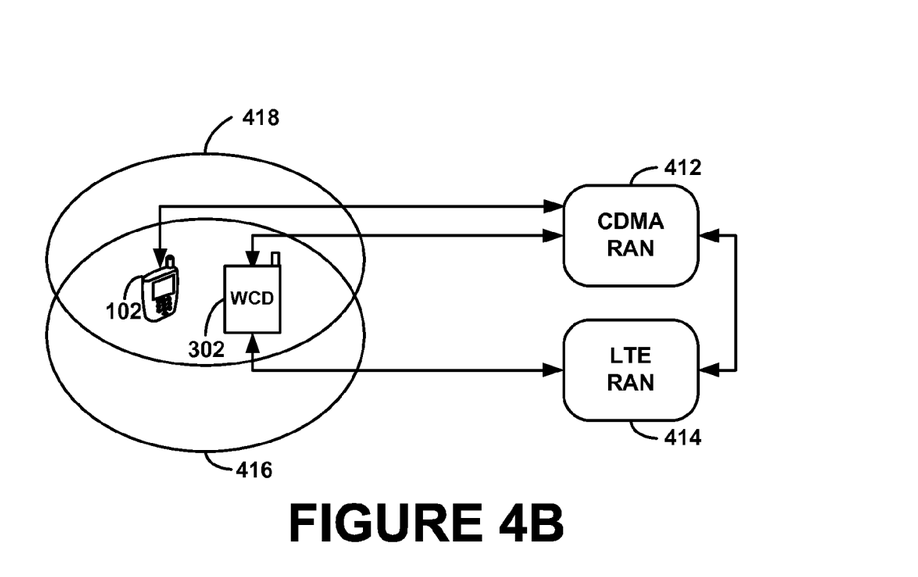
FIG. 4B illustrates a CDMA RAN in communication with an LTE RAN, in accordance with an example embodiment.

FIGS. 4A and 4B illustrate example RAN configurations for network 300. The methods, devices, and systems described herein may operate in either of the types of RAN configurations illustrated in FIGS. 4A and 4B or in RAN configurations not shown herein. FIG. 4A illustrates a RAN 402 that includes LTE component(s) 404 configured to communicate with WCD 302, and CDMA component(s) 408 configured to communicate with WCD 302 and/or WCD 102, in accordance with an example embodiment. LTE component(s) 404 and CDMA component(s) 408 may be in communication with each other through an IWF such as IWF 316 in FIG. 3. WCD 102 may be configured to communicate with CDMA component(s) 408 but not with LTE component(s) 404, and WCD 302 may be configured to communicate with both CDMA components(s) 408 and LTE component(s) 404.

CDMA component(s) 408 may include, for example, BTS 104 (or any of BTSs 202, 204, and 206), BSC 106, and MSC 108. LTE component(s) 404 may include, for example, eNodeB 304, MME 306, HSS 310, and S-GW 308. CDMA component(s) 408 and/or LTE component(s) 404 may include other modules not shown as well.

FIG. 4B illustrates another configuration where a CDMA RAN 412 may be configured to communicate with WCD 302 and WCD 102, and an LTE RAN 414 may be configured to communicate with WCD 302. LTE RAN 414 and CDMA RAN 412 may be configured to communicate with each other as well. In FIG. 4B, WCD 102 may be configured to communicate with CDMA RAN 412 but not with LTE RAN 414, and WCD 302 may be configured to communicate with both CDMA RAN 412 and LTE RAN 414.

CDMA RAN 412 may include, for example, BTS 104, BSC 106, and MSC 108. LTE RAN 414 may include, for example, eNodeB 304, MME 306, HSS 310, and S-GW 308. CDMA RAN 412 and/or LTE RAN 414 may include other components not shown.

FIG. 4A may represent a configuration where equipment related to CDMA component(s) 408 may have already been deployed in RAN 402 and a service provider has added equipment related to LTE component(s) 404, or has upgraded equipment related to CDMA component(s) 408 to make RAN 402 LTE-capable as well. FIG. 4B may represent a configuration where the service provider has deployed equipment related to LTE network 414 separate from equipment related to CDMA network 412. Other configurations are possible, including configurations that combine aspects of FIGS. 4A and 4B.

In FIGS. 4A and 4B, a first wireless coverage area 416 may be defined using an air-interface associated with the LTE component(s) 404 or the LTE RAN 414, and a second wireless coverage area 418 may be defined using an air-interface associated with the CDMA component(s) 408 or the CDMA RAN 412. Both the WCD 102 and the WCD 302 may be within range of both wireless coverage areas 416 and 418.

III. RAN Device

Figure 5:
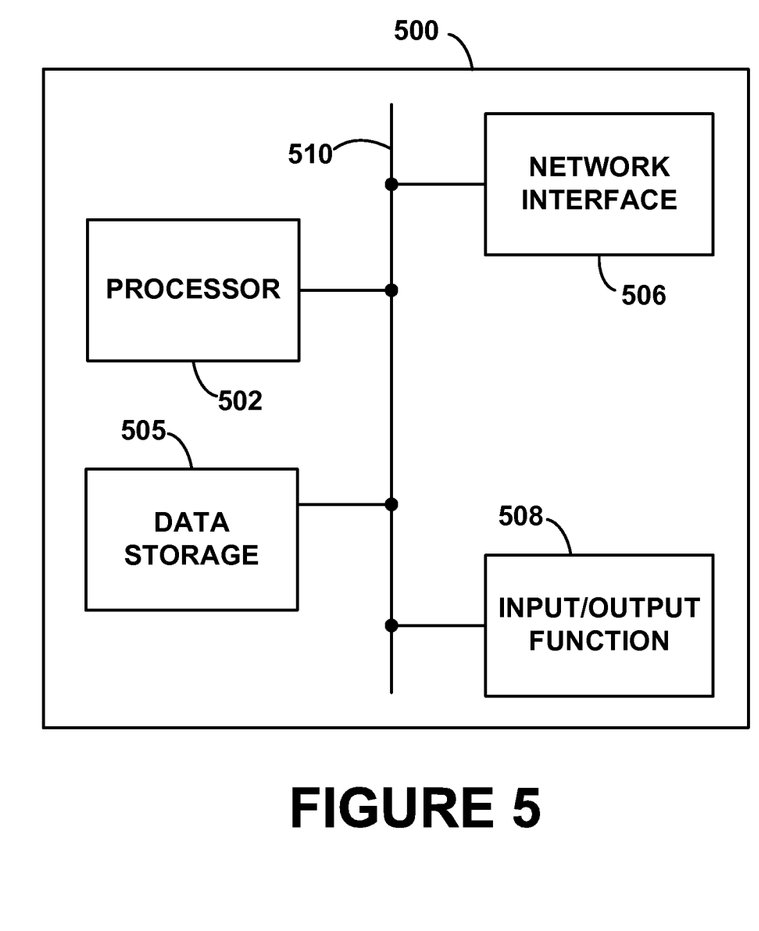
FIG. 5 is a block diagram of a RAN device, in accordance with an example embodiment.

FIG. 5 is a block diagram of an example RAN device 500, illustrating some of the functional components that could be included in a RAN device arranged to operate in accordance with the embodiments herein. Example RAN device 500 could be any type of device found in or associated with a RAN, such as a BTS, a BSC, an MSC, eNodeB, MME, S-GW, an IWF, etc. Thus, it should be understood that the description of RAN device 500 could apply to one or more components used for the purposes described herein.

In this example, RAN device 500 includes a processor 502, a data storage 504, a network interface 506, and an input/output function 508, all of which may be coupled by a system bus 510 or a similar mechanism. Processor 502 can include one or more CPUs, such as one or more general purpose processors and/or one or more dedicated processors (e.g., application specific integrated circuits (ASICs) or digital signal processors (DSPs), etc.).

Data storage 504, in turn, may comprise volatile and/or non-volatile data storage and can be integrated in whole or in part with processor 502. Data storage 504 can hold program instructions, executable by processor 502, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 504 may contain program instructions, perhaps stored on a non-transitory computer-readable medium, executable by processor 502 to carry out any of the methods, processes, or functions disclosed in this specification or the accompanying drawings.

Network interface 506 may take the form of a wireline connection, such as an Ethernet, Token Ring, or T-carrier connection. Network interface 506 may also take the form of a wireless connection, such as IEEE 802.11 (Wifi), BLUETOOTH®, or a wide-area wireless connection. However, other forms of physical layer connections and other types of standard or proprietary communication protocols may be used over network interface 506. Furthermore, network interface 506 may comprise multiple physical interfaces.

Input/output function 508 may facilitate user interaction with example RAN device 500. Input/output function 508 may comprise multiple types of input devices, such as a keyboard, a mouse, a touch screen, and so on. Similarly, input/output function 508 may comprise multiple types of output devices, such as a monitor, printer, or one or more light emitting diodes (LEDs). Additionally or alternatively, RAN device 500 may support remote access from another device, via the network interface 506 or via another interface (not shown), such an RS-232 or USB port.

IV. CDMA Communications

For purposes of illustration, an example embodiment that uses CDMA communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air-interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area.

a. Idle Handoff and Call Establishment

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a sufficiently greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer traffic to the RAN on a reverse traffic channel by applying the WCD's assigned PN long code offset to a PN long code. The WCD may then modulate the bearer traffic according to the resulting point in the PN long code.

b. Soft Handoff

During a call, a WCD may communicate substantially simultaneously via a number of "active" wireless coverage areas at a time. Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a particular WCD concurrently via some or all of the wireless coverage areas in the particular WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

The WCD may continuously, or from time to time, measure the strength of each pilot channel signal that it receives and may notify the RAN when a received pilot strength is above or below designated thresholds. More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))
T_COMP: Difference in signal strength from an active set pilot (e.g., 2 dB)
T_DROP: Threshold pilot strength for removal from the active set (e.g., −16 dB)
T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating, the WCD may be transmitting and/or receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

c. Channel Assignment

Figure 6:
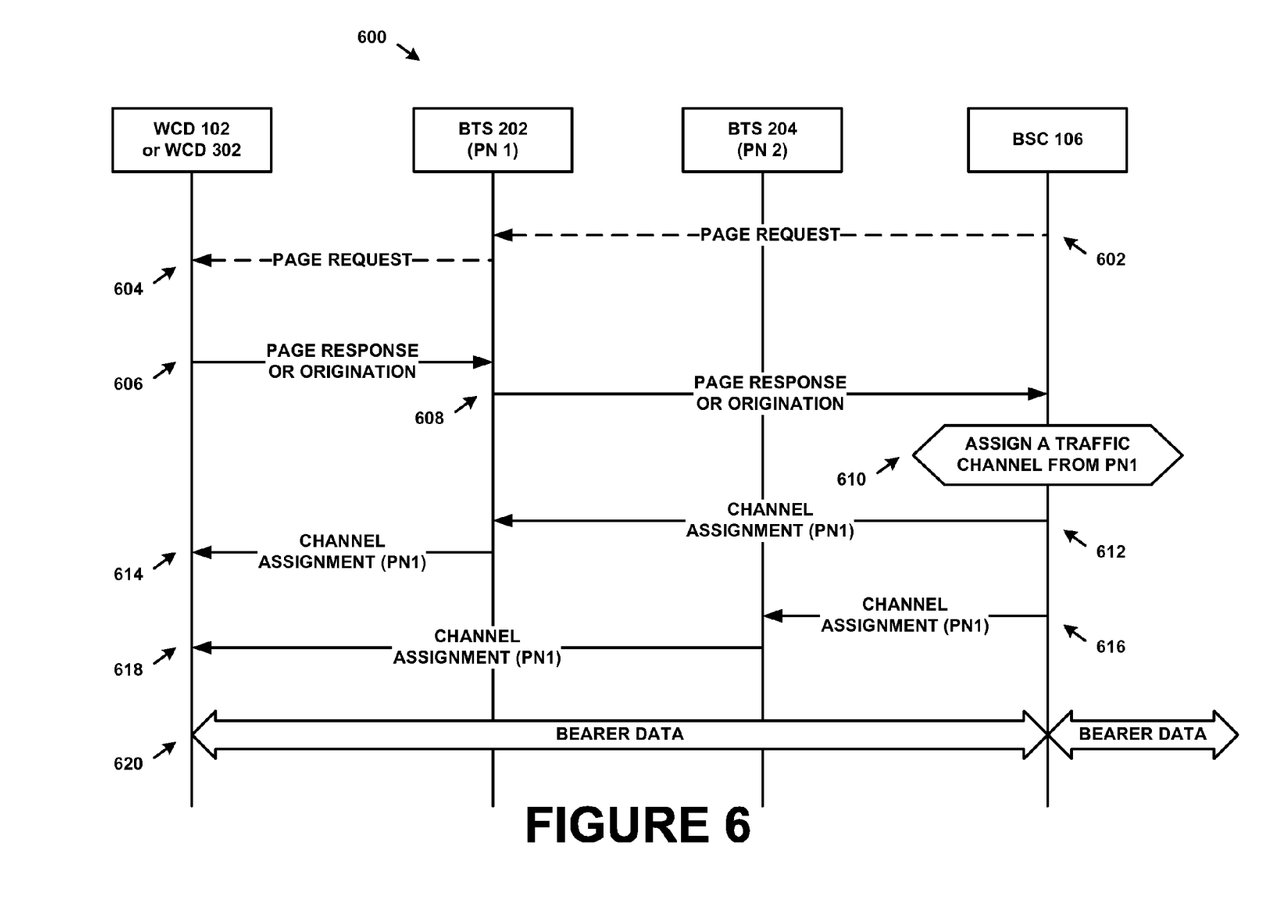
FIG. 6 is a first message flow diagram, in accordance with an example embodiment.

For purposes of illustration, FIG. 6 shows an example message flow 600 of a RAN transmitting channel assignment messages via multiple wireless coverage areas during call establishment. FIG. 6 involves WCD 102 (or WCD 302), BTS 202, BTS 204, and BSC 106. BTS 202 defines a wireless coverage area with PN offset 1 ("PN 1"), and BTS 204 defines another wireless coverage area with PN offset 2 ("PN 2").

Although, the message flow 600 is described with respect to WCD 102, the steps can be applied with respect to WCD 302 as well. For WCD 302, a page request may be sent to an LTE network (or LTE component in the RAN), then the LTE network (or component) may communicate (e.g., through an IWF such as IWF 316) the request to a CDMA network portion (or CDMA components) of the RAN to carry out the steps described in FIG. 6, for example.

BTS 202 and BTS 204 may be controlled by BSC 106. WCD 102 may be able to receive pilot channel signals of sufficient strength from both PN 1 and PN 2 such that WCD 102 could communicate effectively via either of these wireless coverage areas. Without loss of generality, it is assumed that PN 1 is the primary wireless coverage area of WCD 102.

WCD 102 may report, to BSC 106, measurements of the signal strengths at which WCD 102 receives the pilot channels of PN 1 and PN2. This reporting may occur through the transmission of radio environment reports or pilot strength measurement messages (PSMMs), or via a different type of message.

Steps 602 and 604 illustrate BSC 106, via BTS 202, transmitting an optional page request message to WCD 102. Such a page request message may be transmitted when WCD 102 is paged to answer an incoming voice call or to receive incoming data. Steps 606 and 608 illustrate WCD 102 transmitting a message via BTS 202 to BSC 106. This message may be a page response message transmitted on the access channel in response to the optional page request message. Alternatively, this message may be an origination message, also transmitted on the access channel, with which WCD 102 attempts to establish an outgoing voice or data call. Additional alternative message types may also be used for this purpose, and any such message may be transmitted on the access channel or another type of channel.

Regardless of whether an incoming or outgoing call is being established for WCD 102, at step 610, BSC 106 may assign a traffic channel to WCD 102. In a possible scenario, BSC 106 may assign a traffic channel from PN 1. When making the traffic channel assignment, BSC 106 may consider pilot channel signal strength measurements that it received from WCD 102. These considerations may be based on, for example, just the most recently-received measurement, or several recently received measurements. BSC 106 may use these received signal strengths, and/or other information, when determining from which wireless coverage area to assign a traffic channel. Thus, if BSC 106 determines that WCD 102 receives the pilot signal from PN 1 at a lower strength than that of PN 2, BSC 106 may instead assign a traffic channel from PN 2 to WCD 102.

At steps 612 and 614, BSC 106 may transmit a first channel assignment message via BTS 202 to WCD 102. The first channel assignment message may include a traffic channel assignment for PN 1. In other words, the first channel assignment message may instruct WCD 102 to use a particular Walsh code to receive from PN 1. Similarly, at steps 616 and 618, BSC 106 may transmit a second channel assignment message via BTS 204 to WCD 102. The second channel assignment message may also include a traffic channel assignment for PN 1 (thus, these two channel assignment messages may serve to assign the same channel). By transmitting multiple channel assignment messages to WCD 102, the likelihood that WCD 102 receives at least one of these messages is increased. Regardless, at step 620, WCD 102 may begin receiving bearer traffic via BTS 202 (using PN 1). These multiple channel assignment messages may be transmitted to WCD 102 substantially simultaneously. Transmitting multiple channel assignments substantially simultaneously to a particular WCD to assign the same channel may be referred to as Access Handoff (AHO).

While message flow 600 shows only two channel assignment messages are being transmitted to WCD 102, more or fewer channel assignment messages may be transmitted to WCD 102 without departing from the scope of the invention. Further, throughout message flow 600, the names of these messages are used for purposes of convenience and messages with other names may be used for similar purposes.

d. Substantially Simultaneous Transmission of Bearer Data

As described in Section IVb, when the RAN substantially simultaneously communicates bearer data with a WCD via more than one wireless coverage area, the RAN and WCD may be able to engage in soft handoff procedures. Soft handoff may result in fewer dropped calls and a higher overall call quality, especially if the WCD is in motion.

Channel Assignment into Soft Handoff (CASHO) has been proposed as a way of assignment multiple traffic channels from different wireless coverage areas to a WCD during call establishment. Thus, using CASHO procedures may increase the reliability and quality of the initial portions of the calls.

Figure 7:
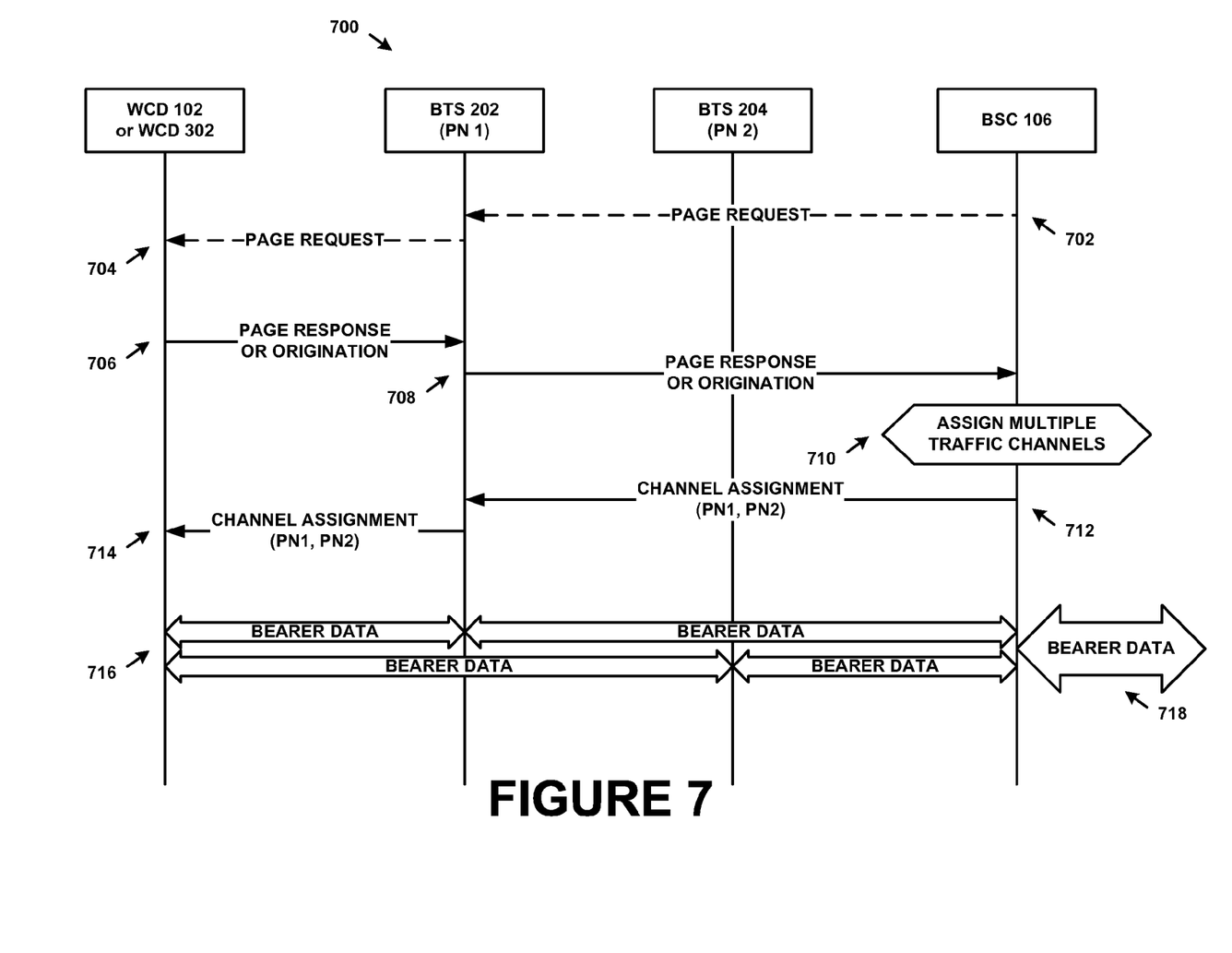
FIG. 7 is second message flow diagram, in accordance with an example embodiment.

For purposes of illustration, FIG. 7 shows an example message flow 700 of a RAN and WCD engaging in CASHO procedures. Like FIG. 6, FIG. 7 involves WCD 102 (or WCD 302), BTS 202, BTS 204, and BSC 106. Although, the message flow 700 is described with respect to WCD 102, the steps can be applied with respect to WCD 302 as well. For WCD 302, a page request may be sent to an LTE network (or LTE component in the RAN), then the LTE network (or component) may communicate (e.g., through an IWF such as IWF 316 in FIG. 3) the request to a CDMA network portion (or CDMA components) of the RAN to carry out the steps described in FIG. 7, for example.

Steps 702 and 704 illustrate BSC 106, via BTS 202, transmitting an optional page request message to WCD 102. Steps 706 and 708 illustrate WCD 102 transmitting a page response message or origination message via BTS 202 to BSC 106. At step 710, BSC 106 may assign multiple traffic channels to WCD 102. In particular, BSC 106 may assign one traffic channel from PN 1, and another traffic channel from PN 2, to WCD 102, in accordance with CASHO procedures. When making the traffic channel assignment, BSC 106 may consider pilot channel signal strength measurements that it received from WCD 102. BSC 106 may receive these signal strengths in radio environment reports or PSMMs, the page response or origination message of steps 706 and 708, or in some other type of message. In any case, BSC 106 may use these received signal strengths, and/or other information, when determining whether and/or how to perform CASHO procedures.

At steps 712 and 714, BSC 106 may transmit a channel assignment message via BTS 202 to WCD 102. The channel assignment message may include traffic channel assignments for both PN 1 and PN 2. In other words, the channel assignment message may instruct WCD 102 to use a particular Walsh code with PN 1 and another Walsh code with PN 2. Accordingly, at steps 716 and 718, WCD 102 may begin transmitting and receiving bearer data via both BTS 202 (using PN 1) and BTS 204 (using PN 2). Thus, via both BTS 202 and BTS 204, WCD 102 may receive forward direction bearer data streams from BSC 106, and may combine these streams into a single stream of bearer data. For example, WCD 102 may add the received signals from BTS 202 and BTS 204. Conversely, via both BTS 202 and BTS 204, BSC 106 may receive reverse direction bearer data streams from WCD 102, and may also combine these streams into a single stream of bearer data.

It should be understood that rather than traversing BTS 202, any of the page request messages, page response or origination messages, and/or channel assignment messages may instead traverse BTS 204, or both BTS 202 and BTS 204. Alternatively, BSC 106 may assign WCD 102 traffic channels from two different PNs defined by the same BTS. Further, the names of these messages are used for purposes of convenience and messages with other names may be used for similar purposes. Additionally, CASHO procedures may be performed such that more than two traffic channels are assigned to a WCD during call initiation. In examples, AHO and CASHO procedures may be implemented together for the same call.

Substantially simultaneous communication using AHO and CASHO procedures may improve the reliability of communication involving the WCD. For instance, call quality may increase and fewer calls may fail. However, AHO and CASHO procedures may involve multiple resources of a CDMA RAN being used by each WCD during a call. As the number of WCDs and calls increase, using multiple resources by each WCD may deplete the air-interface resources of a CDMA RAN. Such depletion of may cause further calls relating to other WCDs to fail since there may be no air-interface resources available to assign to or to be used by the other WCDs.

To alleviate this resource depletion, the RAN may keep track of prevalence of eCSFB WCDs that are capable of communicating through LTE as well as CDMA. If the level of prevalence of eCSFB WCDs reaches a threshold WCD prevalence, the RAN may disable or limit assigning multiple resources to calls being established or that are established with WCDs. For example, the RAN may assign a single resource to a particular WCD or still assign multiple resources but fewer than prior to reaching the threshold WCD prevalence. Thus, the RAN may preserve and prioritize resources. In this case, if a call that is established or is being established with an eCSFB WCD using CDMA fails, the eCSFB WCD may engage in a VOIP call and use LTE resources instead.

If the eCSFB device prevalence decreases, the number of resources assigned to or used by each WCD may increase. For example, the RAN may communicate with a WCD substantially simultaneously via four wireless coverage areas. In response to the prevalence of eCSFB WCDs decreasing, the RAN may begin communicating with the WCD substantially simultaneously via six or more wireless coverage areas.

V. LTE Communications

In an LTE network, Air-interface communications in each coverage area of the LTE network may be encoded or carried in a manner that distinguishes the communications in that coverage area from communications in adjacent coverage areas. For example, each coverage area of the LTE network may have a respective identifier ("cell ID" or "sector ID") that is broadcast in a synchronization signal to distinguish the coverage area from adjacent coverage areas.

To enable a WCD to select an appropriate coverage area in which to operate, eNodeBs (i.e., base stations) of the LTE network may be arranged to broadcast, in each of their coverage areas, a respective pilot signal (or "reference signal"). Further, the LTE network may have a particular network identifier, such as a public land mobile network (PLMN) ID or a carrier frequency on which the system operates, and the eNodeBs in the LTE network may broadcast their pilot signals using that identifier or may separately broadcast an indication of the network identifier. For example, the eNodeBs may broadcast an overhead message such as an LTE "master information block." The WCD may then scan for and evaluate the strength of any detected the pilot signals, and the WCD may then seek to operate in the coverage area broadcasting the strongest pilot signal. For instance, the WCD may transmit, on a reverse link control channel in that coverage area, a registration request or attach request. The serving eNodeB and associated equipment may process the registration and transmit, on a forward link control channel, a registration acknowledgement message. Further, once initially registered in a coverage area, the WCD may continue to monitor the pilot signal of that coverage area as well as the pilot signals of adjacent coverage areas and compare the pilot signals to each other, to help ensure that the WCD continues to operate in the coverage area that provides a reasonably strong coverage.

To initiate a call (e.g., voice call, data session, or other type of call) when operating in a coverage area, the WCD may transmit, on a reverse link access channel of the coverage area, an origination request requesting the serving eNodeB to allocate resources for the call. The eNodeB may then reserve resources for the call and transmit, on a forward link control channel, a directive for the WCD to proceed with the communication using LTE air-interface resources (such as a particular air-interface traffic channel, timeslots, or resource blocks). Likewise, if the eNodeB or associated equipment receives a request to connect a call to the WCD, the eNodeB may transmit, on a forward link control channel, a page message for the WCD. The WCD may receive and respond to that page message to facilitate establishment of the call.

During an ongoing call in a coverage area, the WCD may also continue to monitor the pilot signal of that coverage area and the pilot signals of adjacent coverage areas. For instance, the WCD may regularly measure signal strength that the WCD receives from its serving coverage area and from adjacent coverage areas and may regularly report the signal strength level(s) in radio measurement reports to its serving eNodeB. If appropriate, the eNodeB or associated equipment may then arrange for handoff of the WCD to another coverage area. For instance, if the WCD reports a sufficiently stronger signal from an adjacent coverage area, the eNodeB or associated equipment may arrange a transfer of the call to the adjacent coverage area and may send a handoff direction message to the WCD, instructing the WCD to continue the call in the adjacent coverage area.

Furthermore, the WCD might not only hand off between LTE coverage areas, but may also hand off from the LTE network to a CDMA network. Handoff between different Air-interface protocols may be referred to as "vertical" handoff.

For either LTE or CDMA, a call initiated by a particular WCD may be referred to as a mobile-originated call, and a call received by the particular WCD may be referred to as a mobile-terminated call.

VI. Example Operations

Figure 8:
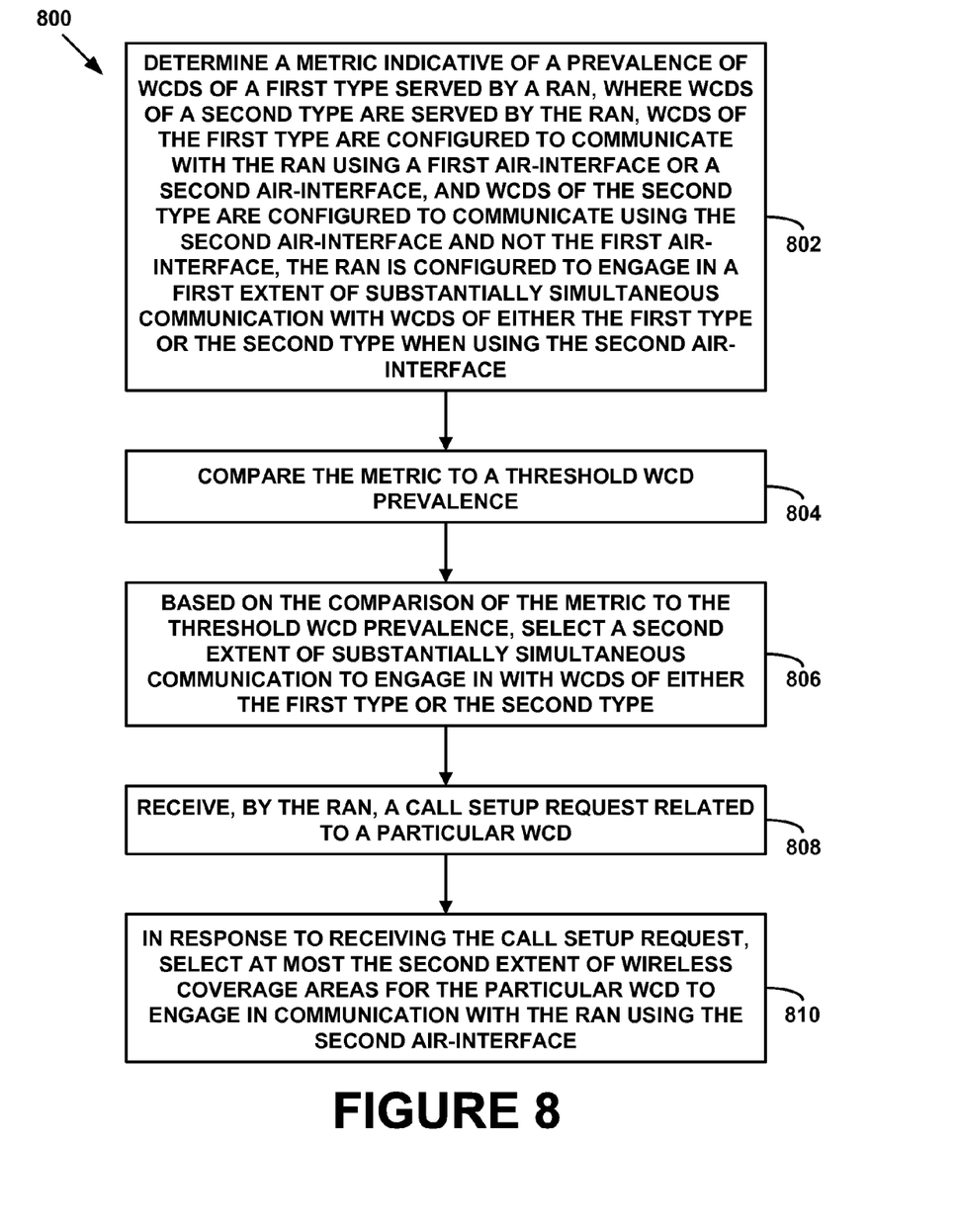
FIG. 8 is a flow chart, in accordance with an example embodiment.

FIG. 8 is a flow chart 800 illustrating enabling an extent of AHO and/or CASHO based on prevalence of WCDs of a given type, in accordance with an example embodiment. Flow chart 800 may include one or more operations, functions, or actions as illustrated by one or more of blocks 802-810. Although the blocks are illustrated in a sequential order, one or more of these blocks may in some instances be performed in parallel, and/or in a different order than those described herein. Also, the various blocks may be combined into fewer blocks, divided into additional blocks, and/or removed based upon the desired implementation.

In addition, flow chart 800 shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may be a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, in flow chart 800 and other processes and methods disclosed herein, each block may represent circuitry that is configured to perform the specific logical functions in the process.

At block 802, a metric indicative of a prevalence of WCDs of a first type that are served by a RAN may be determined. WCDs of a second type may also be served by the RAN. WCDs of the first type may be configured to communicate with the RAN using either a first air-interface or a second air-interface. WCDs of the second type may be configured to communicate using the second air-interface, but not the first air-interface. The RAN may be configured to engage in a first extent of substantially simultaneous communication with WCDs of the first type and/or the second type when using the second air-interface As examples for illustration, the first air-interface may operate in accordance with LTE, and the second air-interface may operate in accordance with CDMA. In this example, the first WCD may be an eCSFB device configured for communication using LTE and CDMA. The second WCD may be a non-eCSFB device configured for communication using CDMA, but not configured to communicate using LTE. The RAN may be a CDMA RAN, such as CDMA RAN 412 described in FIG. 4B, communicating with WCDs of the first type and WCDs of the second type in accordance with CDMA, and coupled to a separate LTE RAN 414. In another example, the RAN may include CDMA components communicating with WCDs of the first type and WCDs of the second type in accordance with CDMA, and LTE components communicating with WCDs of the first type as described in FIG. 4A.

The RAN may, for example, use AHO and CASHO procedures to engage in a first extent of substantially simultaneous communication with WCDs of the first type and/or the second type using CDMA. As an example for illustration, the first extent of substantial communication may involve the RAN using three to six wireless coverage areas to communicate with a particular WCD of either the first type or the second type to establish a call or during a call. In other examples, the first extent may include more or fewer wireless coverage areas.

Generally, the metric indicative of prevalence of WCDs of the first type (e.g., eCSFB device) may be a quantitative indication of how prevalent WCDs of the first type have been, currently are, and/or are expected to be, in the RAN. In some examples, the metric may be equal to or otherwise based on a number of WCDs of the first type register with and/or communicating with the RAN. For example, the RAN may determine the metric by determining how many WCDs of the first type are currently registered and/or communicating with the RAN.

In other examples, the metric may be determined to be equal to, or otherwise based upon, a percentage of all WCDs communicating with the RAN that are WCDs of the first type. For example, the RAN may determine the metric by determining the number of WCDs of the first type that are currently registered and/or communicating in the RAN, and a total number of WCDs (both first type and second type and any other devices) that are currently registered and/or communicating in the RAN. The RAN may then determine the percentage of all WCDs of the first type by dividing a current number of WCDs of the first type by the total number of WCDs that are currently registered and/or communicating in the RAN.

Additionally or alternatively, the metric may be based on historical presence of WCDs of the first type in a given coverage area or coverage areas. For example, the metric may be determined based on an average number (or percentage) of WCDs of the first type that operate in a wireless coverage area at a given point in time. The RAN may periodically or from time-to-time determine how many (or what percentage) WCDs of the first type are currently registered in the wireless coverage area, and maintain a database of this information on a per-wireless coverage area basis. The RAN may then determine the metric to be equal to, or to be otherwise based on, the average number (or percentage) of WCDs of the first type that are registered and/or communicating in the given coverage area at a given point in time. The average may be determined over all time, or may be determined as a moving average over a certain period of time. The metric may be determined per wireless coverage area, or per a group of wireless coverage areas (e.g., two or three wireless coverage areas).

It should be understood that the above-described techniques for determining the metric indicative of prevalence of WCDs of the first type are provided for illustrative purposes, and are not intended to be limiting. Other metrics and other techniques for determining such metrics are also possible.

At block 804, the metric may be compared to a threshold WCD prevalence. For example, the RAN may compare the number of WCDs of the first type to a threshold number, or compare a percentage of WCDs of the first type to a threshold percentage. Based on the comparison, the RAN may determine whether prevalence of the WCDs of the first type reached a predetermined level or not, for example. The threshold WCD prevalence may be a predetermined threshold, or may be a dynamic threshold that changes based on circumstances and parameters of the RAN (e.g., time of day, history of use of WCDs of the first type and second type in a given area, etc.).

At block 806, based on the comparison of the metric to the threshold WCD prevalence, a second extent of substantially simultaneous communication with WCDs of either the first type or the second type may be selected.

For example, if the metric indicative of prevalence of WCDs of the first type (e.g., eCSFB WCDs) meets the threshold WCD prevalence, the RAN may engage in a second extent of substantially simultaneous communication such that the RAN disables or limits assigning multiple resources to calls. Such limiting may involve reducing a number of channel assignment messages per channel assignment and/or reducing a number of wireless coverage areas in an active set. For example, the second extent may involve the RAN communicating with WCDs of the first type and/or the second type via a single wireless coverage area or a number of wireless coverage areas that is less than a respective number of wireless coverage areas of the first extent. Thus, the RAN may preserve and prioritize resources.

Additionally or alternatively, if the metric is less than the threshold WCD prevalence, the RAN may communicate with a WCD using the number of wireless coverage areas of the first extent or more.

At block 808, a call setup request related to a particular WCD may be received. The particular WCD may be a WCD of either the first type or the second type. The RAN may receive a call setup request from the particular WCD (i.e., a request for a mobile-originated call) or may receive the call setup request for the particular WCD (i.e., a request for a mobile-terminated call).

At block 810, in response to receiving the call setup request, at most the second extent of wireless coverage areas may be selected for the particular WCD to engage in communication with the RAN using the second air-interface. If the second extent consists of one wireless coverage area, the RAN may communicate with the particular WCD via the one wireless coverage area. If the second extent consists of more than one wireless coverage area, the RAN may communicate with the particular WCD substantially simultaneously via each selected wireless coverage area.

During establishment of the call in which the particular WCD participates, the RAN may carry out AHO procedures and substantially simultaneously transmit respective channel assignment messages to the particular WCD via each selected wireless coverage area. Additionally or alternatively, during establishment of the call in which the particular WCD participates, the RAN may carry out CASHO procedures and assign, to the particular WCD, respective traffic channels from each assigned wireless coverage area. Thus, during an initial portion of the call, the RAN may communicate substantially simultaneously with the particular WCD perhaps exchanging identical copies of the same bearer traffic with the particular WCD via each of the assigned traffic channels.

In an example, the second extent may vary based on type of the particular WCD. For example, if the particular WCD is of the first type (e.g., eCSFB WCD), the RAN may select a fewer wireless coverage areas than if the particular WCD is of the second type (non-eCSFB). WCDs of the first type can communicate not only using the second air-interface, but also using the first air-interface. Thus, if a call that is established or is being established, with a WCD of the first type using the second air-interface, fails, the WCD of the first type may engage in a respective call using the first air-interface instead.

For instance, if the first air-interface operates according LTE and the second air-interface operates according to CDMA, the WCD of the first type (e.g., eCSFB WCD) may engage in a VOIP call, or Voice Over LTE (VoLTE) call instead of a circuit-switched CDMA call.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    determining, by a radio access network (RAN), a metric indicative of a prevalence of wireless communication devices (WCDs) of a first type that are served by the RAN, wherein WCDs of a second type are also served by the RAN, wherein WCDs of the first type are configured to communicate with the RAN using a first air-interface or a second air-interface, wherein WCDs of the second type are configured to communicate using the second air-interface and not the first air-interface, and wherein the RAN is configured to engage in a first extent of substantially simultaneous communication with WCDs of either the first type or the second type when using the second air-interface;
    comparing the metric to a threshold WCD prevalence;
    based on the comparison of the metric to the threshold WCD prevalence, selecting a second extent of substantially simultaneous communication to engage in with WCDs of either the first type or the second type when using the second air-interface;
    receiving, by the RAN, a call setup request related to a particular WCD; and
    in response to receiving the call setup request, selecting at most the second extent of wireless coverage areas for the particular WCD to engage in communication with the RAN via the second air-interface.

2. The method of claim 1 further comprising:
    if the selected wireless coverage areas consist of one wireless coverage area, communicating with the particular WCD via the one wireless coverage area; and
    if the selected wireless coverage areas consist of more than one wireless coverage area, communicating with the particular WCD substantially simultaneously via each selected wireless coverage area.

3. The method of claim 1, wherein communicating with the particular WCD substantially simultaneously via each selected wireless coverage area comprises:
    during establishment of a call in which the particular WCD participates, the RAN transmitting respective channel assignment messages to the particular WCD via each selected wireless coverage area.

4. The method of claim 1, wherein communicating with the particular WCD substantially simultaneously via each selected wireless coverage area comprises:
    during establishment of a call in which the particular WCD participates, the RAN assigning, to the particular WCD, respective traffic channels from each selected wireless coverage area; and
    during an initial portion of the call, the RAN exchanging bearer traffic with the particular WCD via each of the assigned traffic channels.

5. The method of claim 4, wherein the RAN transmits and receives identical copies of the same bearer traffic via each of the assigned traffic channels.

6. The method of claim 1, wherein the first air-interface operates in accordance with Long-Term Evolution (LTE), and wherein the second air-interface operates in accordance with Code Division Multiple Access (CDMA).

7. The method of claim 6, wherein the RAN is a CDMA RAN.

8. The method of claim 6, wherein the RAN comprises:
    a CDMA component configured to communicate using the second air-interface; and
    an LTE component configured to communicate using the first air-interface.

9. The method of claim 1, wherein the metric comprises a number of WCDs of the first type served by the RAN, and wherein comparing the metric to the threshold WCD prevalence comprises determining that the number of WCDs of the first type exceeds the threshold WCD prevalence.

10. The method of claim 1, wherein the metric comprises a percentage of WCDs of the first type served by the RAN out of all WCDs served by the RAN, and wherein comparing the metric to the threshold WCD prevalence comprises determining that the percentage of WCDs of the first type exceeds the threshold WCD prevalence.

11. The method of claim 1, wherein if the metric meets the threshold WCD prevalence, the second extent is selected to be less than the first extent, and wherein if the metric does not meet the threshold WCD prevalence, the second extent is selected to be greater than the first extent.

12. A non-transitory computer-readable medium having stored thereon program instructions that, upon execution by a radio access network (RAN) device of a RAN, cause the RAN device to perform functions comprising:
    determining a metric indicative of a prevalence of wireless communication devices (WCDs) of a first type that are served by the RAN, wherein WCDs of a second type are also served by the RAN, wherein WCDs of the first type are configured to communicate with the RAN using a first air-interface or a second air-interface, wherein WCDs of the second type are configured to communicate using the second air-interface and not the first air-interface, and wherein the RAN device is configured to engage in a first extent of substantially simultaneous communication with WCDs of either the first type or the second type when using the second air-interface;
    comparing the metric to a threshold WCD prevalence;
    based on the comparison of the metric to the threshold WCD prevalence, selecting a second extent of substantially simultaneous communication to engage in with WCDs of either the first type or the second type when using the second air-interface;
    receiving a call setup request related to a particular WCD; and
    in response to receiving the call setup request, assigning at most the second extent of wireless coverage areas for the particular WCD to engage in communication with the RAN device using the second air-interface.

13. The non-transitory computer-readable medium of claim 12, wherein the functions further comprise:
    if the selected wireless coverage areas consist of one wireless coverage area, communicating with the particular WCD via the one wireless coverage area; and
    if the selected wireless coverage areas consist of more than one wireless coverage area, communicating with the particular WCD substantially simultaneously via each selected wireless coverage area.

14. The non-transitory computer-readable medium of claim 12, wherein the function of communicating with the particular WCD substantially simultaneously via each selected wireless coverage area comprises:

during establishment of a call in which the particular WCD participates, transmitting respective channel assignment messages to the particular WCD via each selected wireless coverage area.

15. The non-transitory computer-readable medium of claim 12, wherein the function of communicating with the particular WCD substantially simultaneously via each selected wireless coverage area comprises:

during establishment of a call in which the particular WCD participates, assigning, to the particular WCD, respective traffic channels from each selected wireless coverage area; and during an initial portion of the call, exchanging bearer traffic with the particular WCD via each of the assigned traffic channels.

16. The non-transitory computer-readable medium of claim 15, wherein the RAN device transmits and receives identical copies of the same bearer traffic via each of the assigned traffic channels.

17. A radio access network (RAN) device of a RAN comprising:

a processor;
a data storage; and
program instructions, stored in the data storage and executable by the processor, that cause the RAN device to:
determine a metric indicative of a prevalence of wireless communication devices (WCDs) of a first type that are served by the RAN, wherein WCDs of a second type are also served by the RAN, wherein WCDs of the first type are configured to communicate with the RAN device using a first air-interface or a second air-interface, wherein WCDs of the second type are configured to communicate using the second air-interface and not the first air-interface, and wherein the RAN device is configured to engage in a first extent of substantially simultaneous communication with WCDs of either the first type or the second type when using the second air-interface;
compare the metric to a threshold WCD prevalence;
based on the comparison of the metric to the threshold WCD prevalence, select a second extent of substantially simultaneous communication to engage in with WCDs of either the first type or the second type when using the second air-interface;
receive a call setup request related to a particular WCD; and
in response to receiving the call setup request, select at most the second extent of wireless coverage areas for the particular WCD to engage in communication with the RAN device using the second air-interface.

18. The RAN device of claim 17, wherein the program instructions are further executable by the processor to cause the RAN device to:

communicate, if the selected wireless coverage areas consist of one wireless coverage area, with the particular WCD via the one wireless coverage area; and communicate, if the selected wireless coverage areas consist of more than one wireless coverage area, with the particular WCD substantially simultaneously via each selected wireless coverage area.

19. The RAN device of claim 18, wherein, to communicate with the particular WCD substantially simultaneously via each selected wireless coverage area, the program instructions are further executable by the processor to cause the RAN device to:

transmit, during establishment of a call in which the particular WCD participates, respective channel assignment messages to the particular WCD via each selected wireless coverage area 20. The RAN device of claim 19, wherein, to communicate with the particular WCD substantially simultaneously via each selected wireless coverage area, the program instructions are further executable by the processor to cause the RAN device to:

assign, during establishment of a call in which the particular WCD participates, to the particular WCD, respective traffic channels from each selected wireless coverage area; and exchange, during an initial portion of the call, bearer traffic with the particular WCD via each of the assigned traffic channels.

* * * * *